United States Patent [19]

Briggs

[11] Patent Number: 5,004,255

[45] Date of Patent: Apr. 2, 1991

[54] PAINTERS PALETTE

[76] Inventor: Beatrice E. Briggs, 403 Kansas Dr., Goshen, Ind. 46526

[21] Appl. No.: 244,337

[22] Filed: Dec. 21, 1988

[51] Int. Cl.$^5$ .............................................. B62B 3/10
[52] U.S. Cl. ............................. 280/79.5; 15/257.06; 108/95; 248/129; 280/638
[58] Field of Search .............. 280/79.11, 79.5, 79.2, 280/79.3, 43.2, 47.34, 47.35, 638, 32.5, 30, 35; 108/95, 96, 105; 248/132, 129; D32/53.1; D4/122; 15/257.06

[56] References Cited

U.S. PATENT DOCUMENTS

| D. 292,533 | 10/1987 | Saraga | D32/53.1 |
| 1,759,749 | 5/1930 | Knight | 280/79.3 |
| 2,643,045 | 6/1953 | Renfro | 108/96 |

FOREIGN PATENT DOCUMENTS 270037  7/1964  Netherlands ........................ 108/95

Primary Examiner—David M. Mitchell

[57] ABSTRACT

A painters palette consisting of an upper platform, a middle platform, a lower platform. The system is designed to be moveable by the use of four ball casters, to be raised or lowered by the use of a center spine screw bolt and a center spine screw nut. The center spine screw bolt is connected to the upper platform holding bucket bottom. The center spine screw nut connected to the middle platform is used to receive, guide and support the spine screw bolt and the upper platform with the lower platform giving support to the middle platform. Embodiments disclosed include the oblong trim pallet; the flat paint spout lid with screw cap; the flat platform cover with four molded legs; the roller pallet having angle duel ends and four top angle molded legs.

5 Claims, 4 Drawing Sheets

PAINTERS PALETTE

SUMMARY OF THE INVENTION

The present invention provides an improved painters palette. The improved invention is designed to be moveable by the use of four ball casters. Further, the invention is designed to rise 28 inches to reach an height of approximately 66¾ inches and lowered to an height of approximately 37¼ inches by the use of a center spine screw bolt and a center spine screw nut. The improved invention consisting of an upper platform, a middle platform and a lower platform, with the upper platform having a connected holding bucket.

The present system provides a center spine screw bolt, which supports the upper platform and holding bucket, with the bottom of the holding bucket being connected to one end of a spine screw bolt having a pin that protudes through the spine screw bolt opposite end.

A center spine screw nut, which receives, support and guides the spine screw bolt and supports the upper platform, is connected to the middle platform.

The lower platform, having four sides to form a bottom box, which supports the upper and middle platform, has four ball caster for easy movement.

The four legs, 29½ inches height, connected to the middle and lower platform, will provide space for the lowering of the spine screw bolt and supports the upper and middle platform.

A part of the invention is the oblong trim pallet; the duel angle ends roller pallet having four tap angle molded legs; the flat platform cover having four molded legs; the flat paint spout lid having a screw cap to fit the spout.

The invention and its objects and advantages, will become more apparent in the detailed description presented herein after.

DETAILED DESCRIPTION OF EMBODIMENTS

The present description will be of elements forming part of the present invention. Elements not specifically shown or described herein are understood to be selected from those known in the art.

Figure 1:
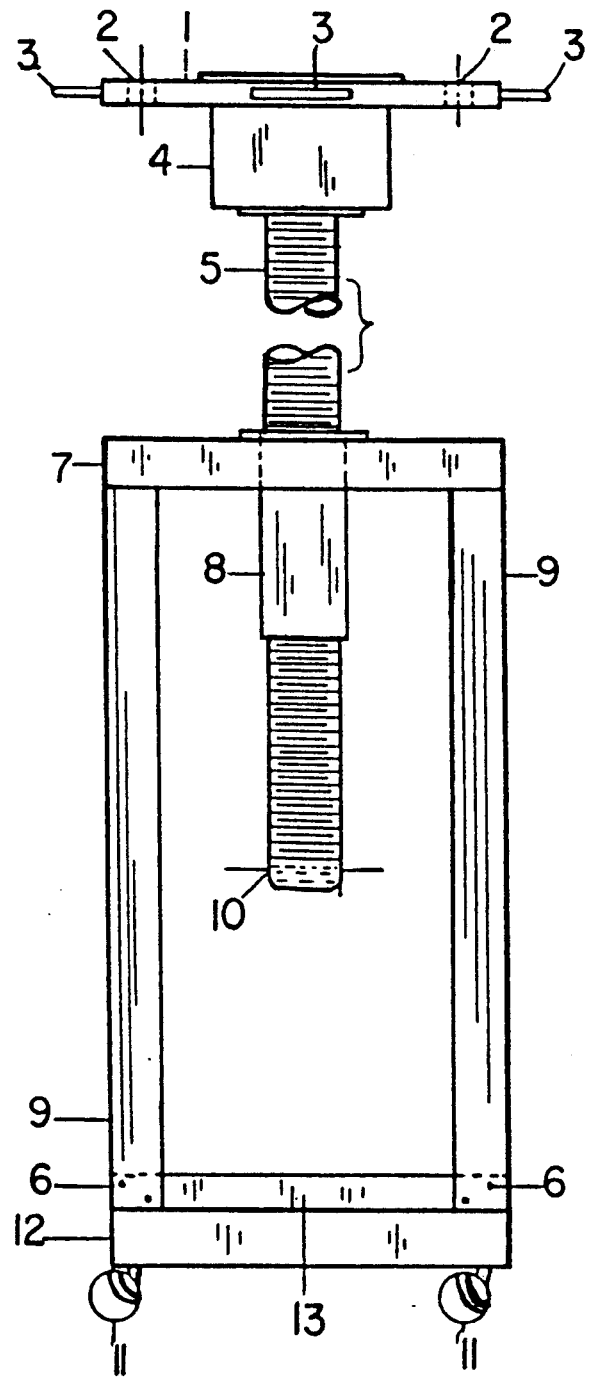
FIG. 1 is a schematic perspective view of the upper platform.

The invention is embodied by the lower cart, its vertically adjustable upper platform and a roller paint tray or magnatic cover on the upper platform. Referring now to the drawings and to FIG. 1, is the upper holding carrying platform top designated 1 supported by the center spine screw bolt 8. Such system includes four pull handles designated 2, four leg holes designated 3 for supporting roller pallet FIG. 3 and holding carrying platform cover FIG. 4, six screw bolts designated 4 to connect holding bucket brim designated 5 of holding bucket designated 6 to upper holding carrying platform top 1, four screw bolts designated 7 to connect center spin screw bolt 8 to bottom of holding bucket 6. The center spine screw bolt designated 8 reinforce, support, raise and lower carrying platform 1. One support element is a bolt or pin designated 9 protuding through the bottom-end of the center spine screw bolt 8 which controls the height the upper platform will rise.

Figure 2:
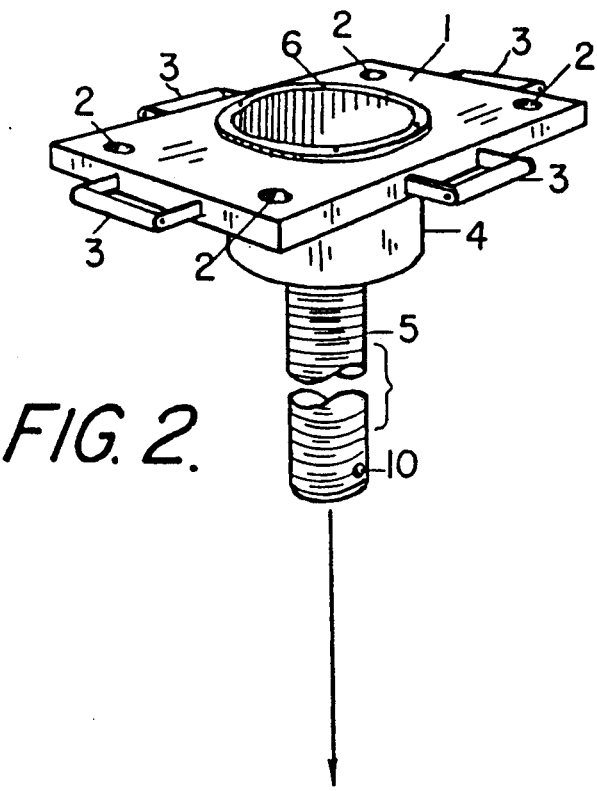
FIG. 2 is a schematic perspective view of the middle and lower platform.

Part of this system, referring now to FIG. 2, is the supporting center spine screw nut brim designated 10, the four screw bolts designated 11 which connects supporting center spine screw nut designated 14 to middle supporting platform top designated 12. The center spine screw nut 14 receives, guides, support and reinforce the center spine screw bolt 8. Included is the four supporting legs designated 13 connected to the middle supporting platform top 12 and the bottom supporting platform designated 16 having four sides designated 15 by sixteen screw bolts designated 17. Being part of this system is the four ball casters designated 18 fasten to bottom supporting platform 16.

Figure 3:
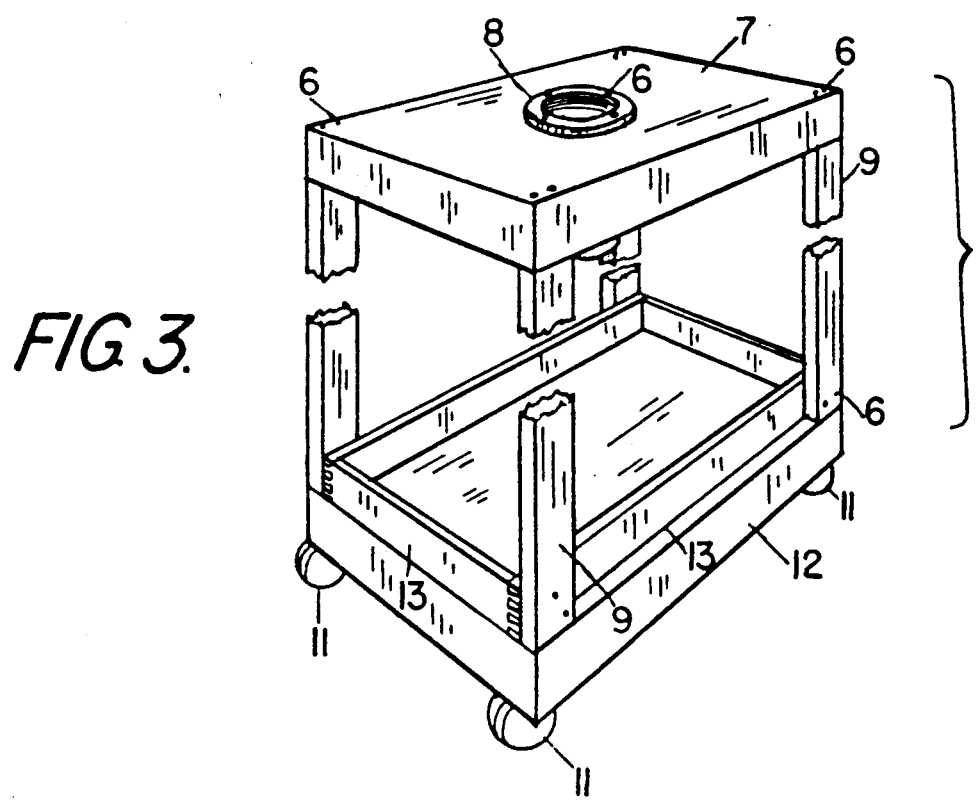
FIG. 3 is a perspective view of a roller paint pallet.

One embodiment, referring now to FIG. 3, is the center side of roller pallet designated 19 having an angle bottom designated 20, with a pouring spout designated 21, four supporting molded legs designated 22 that are angle at the top to support angle bottom of roller pallet.

Figure 4:
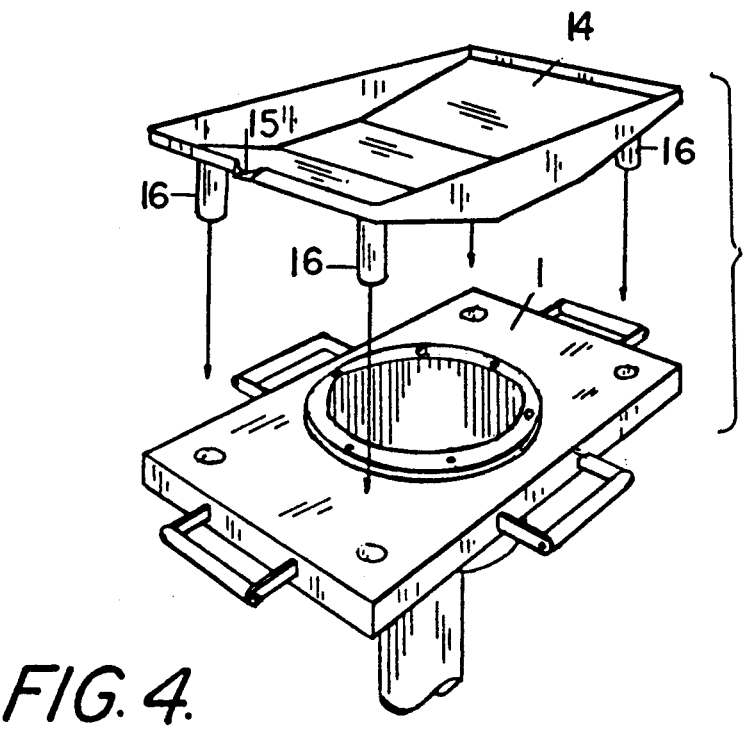
FIG. 4 is a schematic perspective view of the platform cover.

Part of this system, referring now to FIG. 4, is a magnatic cover designated 23 for the upper platform 1, which covers bucket hole 6 of platform 1. Includes is a center identification circle line designated 24, four supporting legs designated 25.

Figure 5:
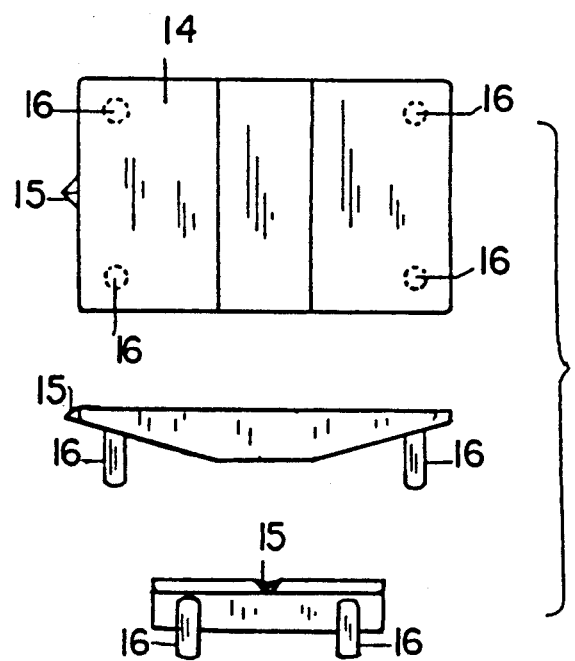
FIG. 5 is a perspective view of a trim pallet.
Figure 6:
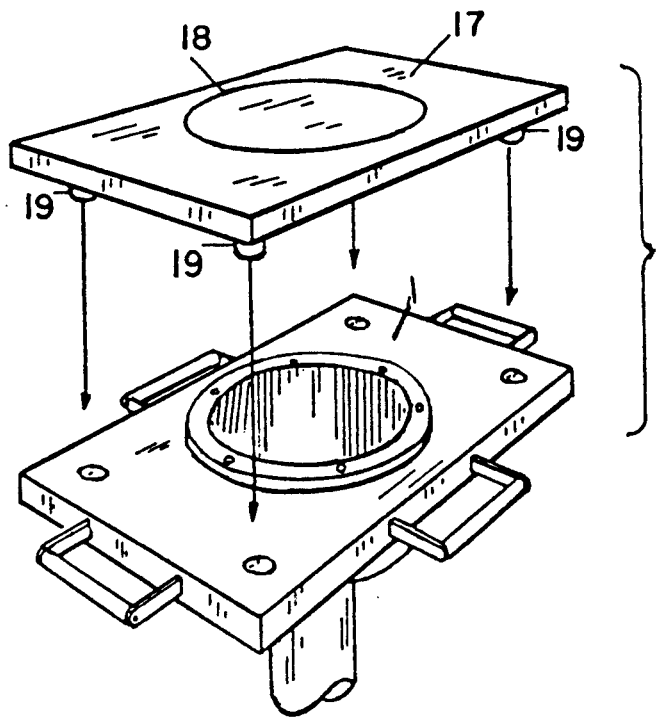
FIG. 6 is a perspective view of a paint spout lid.
Figure 7:
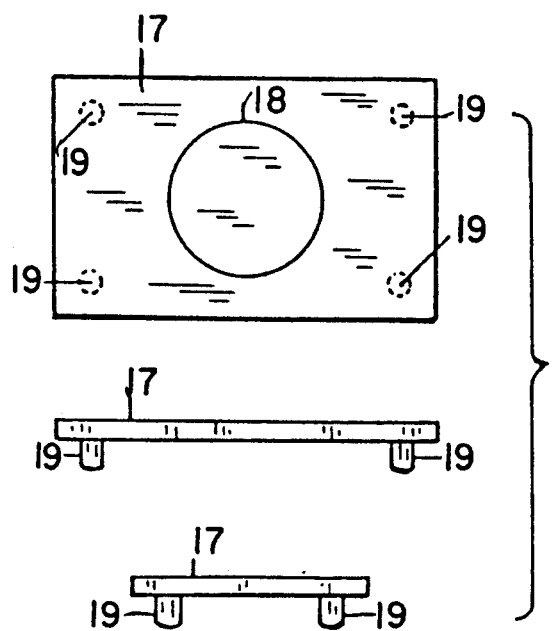

One embodiment of this system, referring now to FIG. 5, is the trim pallet having a flat bottom designated 26. Being part of this system, referring now to FIG. 6, is the top of a paint spout lid designated 27, is flat with a circle recess grove designated 28 having pouring spout designated 29 with screw lines designated 30 for cap, not shown, for pouring spout designated 31.

The use of the painters palette provided by the present invention provides a compact structure that facilitates home painting. For instance such system is mounted on a support frame that is mounted on ball casters is designed to be easily moved parallel or along the side of a painter's ladder or blanks in easy reach of the painter, allowing the painter to move ladders without first removing the holder of paint, it can be raised when painting ceiling and lowered when painting lower walls keeping paint within easy reach of the painter. A painter using paster's stilts would find the use of the painters palette an easier way to do painting rather painting by paint brush or by the paint roller, due to the duel end roller pallet. The trim pallet allows for holding a small amount of paint in one hand while painting with the other when painting trim and closets. The paint spout lid, will prevent the paint from running down the side of a paint can, fits in the grove of a paint can and used for pouring and storing unused paint.

The embodiments being part of this system have been described for the purposes of illustration only, without any intention of limiting the scope of the present invention. Rather it is the intention that the present invention be limited only by the claims.

What is claimed is:

1. A painter palette comprising an upper holding and carrying platform 1, a middle supporting platform 7, a lower supporting platform 12;

said upper holding and carrying platform having four holes adapted to cooperate with structure depending from an accessory placed on said upper platform;

said upper platform further including a center circle opening holding and carrying a bucket 4 adapted to hold a paint can, said bucket including a brim 6 fastened to the upper supporting platform 1;

a center support spine screw bolt 5 fastened to the bottom center of said holding and carrying bucket, and having a hole 10 in the bottom end for a pin or bolt;

said middle platform including a center support spine screw nut 8 to cooperate with the center spine screw bolt 5 to reinforce, support, raise and lower said upper holding and carrying platform 1.

2. A painters palette according to claim 1 wherein said lower platform includes four upwardly extending legs fastened to said middle platform; and ball castors connected to the bottom of said lower platform.

3. A painters palette according to claim 1 wherein said accessory comprises:

a roller pallet having a center bottom with dual ends, each angling upwardly therefrom, said roller pallet including four angle top molded legs extending downwardly to cooperate with the said holes of the upper platform.

4. A painters palette according to claim 1, wherein said accessory comprises:

a platform cover having a center circle indentification line 18 with four molded legs 19 to cooperate with said holes of said upper platform.

5. A painters palette as in claim 4, wherein said platform cover is made from a magnetic material.

* * * * *